United States Patent
Umemoto et al.

(10) Patent No.: US 9,573,837 B2
(45) Date of Patent: Feb. 21, 2017

(54) GLASS CERAMIC COMPOSITION AND COIL ELECTRONIC COMPONENT

(71) Applicant: TDK CORPORATION, Tokyo (JP)

(72) Inventors: Shusaku Umemoto, Tokyo (JP); Takashi Suzuki, Tokyo (JP); Masaki Takahashi, Tokyo (JP); Hidekazu Sato, Tokyo (JP); Yukari Akita, Tokyo (JP); Kazuya Tobita, Tokyo (JP); Shinichi Kondo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/015,420

(22) Filed: Feb. 4, 2016

(65) Prior Publication Data

US 2016/0229738 A1    Aug. 11, 2016

(30) Foreign Application Priority Data

Feb. 10, 2015  (JP) .................................. 2015-024761

(51) Int. Cl.
| | |
|---|---|
| C03C 8/22 | (2006.01) |
| C03C 8/14 | (2006.01) |
| H01F 27/28 | (2006.01) |
| C03C 3/089 | (2006.01) |
| H01F 17/00 | (2006.01) |
| H01F 27/29 | (2006.01) |
| C03C 3/091 | (2006.01) |

(Continued)

(52) U.S. Cl.
CPC ............... *C03C 3/089* (2013.01); *C03B 19/06* (2013.01); *C03C 3/091* (2013.01); *C03C 3/093* (2013.01); *C03C 8/22* (2013.01); *C03C 14/004* (2013.01); *C04B 35/00* (2013.01); *H01F 17/0013* (2013.01); *H01F 27/292* (2013.01)

(58) Field of Classification Search
CPC ........... C03C 8/14; C03C 8/22; H01F 27/2804
See application file for complete search history.

(56) References Cited

U.S. PATENT DOCUMENTS 6,008,151 A * 12/1999 Sasaki ................ C03C 10/0054
  501/17
6,444,598 B1 * 9/2002 Kawakami ............. C03C 3/062
  501/32

(Continued)

FOREIGN PATENT DOCUMENTS

| JP | 2005-015239 A | 1/2005 |
|---|---|---|
| JP | 4239534 B2 | 3/2009 |
| JP | 2013-058538 A | 3/2013 |

*Primary Examiner* — Karl Group
(74) *Attorney, Agent, or Firm* — Oliff PLC

(57) ABSTRACT

A glass ceramic composition of the present invention includes a main component composed of a first glass, a second glass, $Al_2O_3$, and $SiO_2$. The first glass is $SiO_2$—$K_2O$—$B_2O_3$ based glass. The second glass is MO—$SiO_2$—$Al_2O_3$—$B_2O_3$ based glass ("M" is an alkaline-earth metal) and/or CaO—$SiO_2$—$Al_2O_3$—ZnO—$ZrO_2$—$B_2O_3$ based glass. In case that the total amount of the main component is 100 wt %, the main component contains the second glass of 12 to 30 wt %, the first and second glass of 40 to 56 wt % in total, and further $Al_2O_3$ of 7 to 18 wt %.

9 Claims, 1 Drawing Sheet

(51) Int. Cl.
    *C03C 3/093*     (2006.01)
    *C03C 14/00*     (2006.01)
    *C04B 35/00*     (2006.01)
    *C03B 19/06*     (2006.01)

(56) References Cited

U.S. PATENT DOCUMENTS

| | | | | |
|---|---|---|---|---|
| 8,525,039 | B2* | 9/2013 | Nishino | C03C 8/02 |
| | | | | 174/257 |
| 9,159,467 | B2* | 10/2015 | Umemoto | C03C 14/00 |
| 2003/0119647 | A1* | 6/2003 | Sanichi | C03C 3/064 |
| | | | | 501/17 |
| 2014/0220364 | A1* | 8/2014 | Umemoto | C03C 14/00 |
| | | | | 428/434 |

* cited by examiner

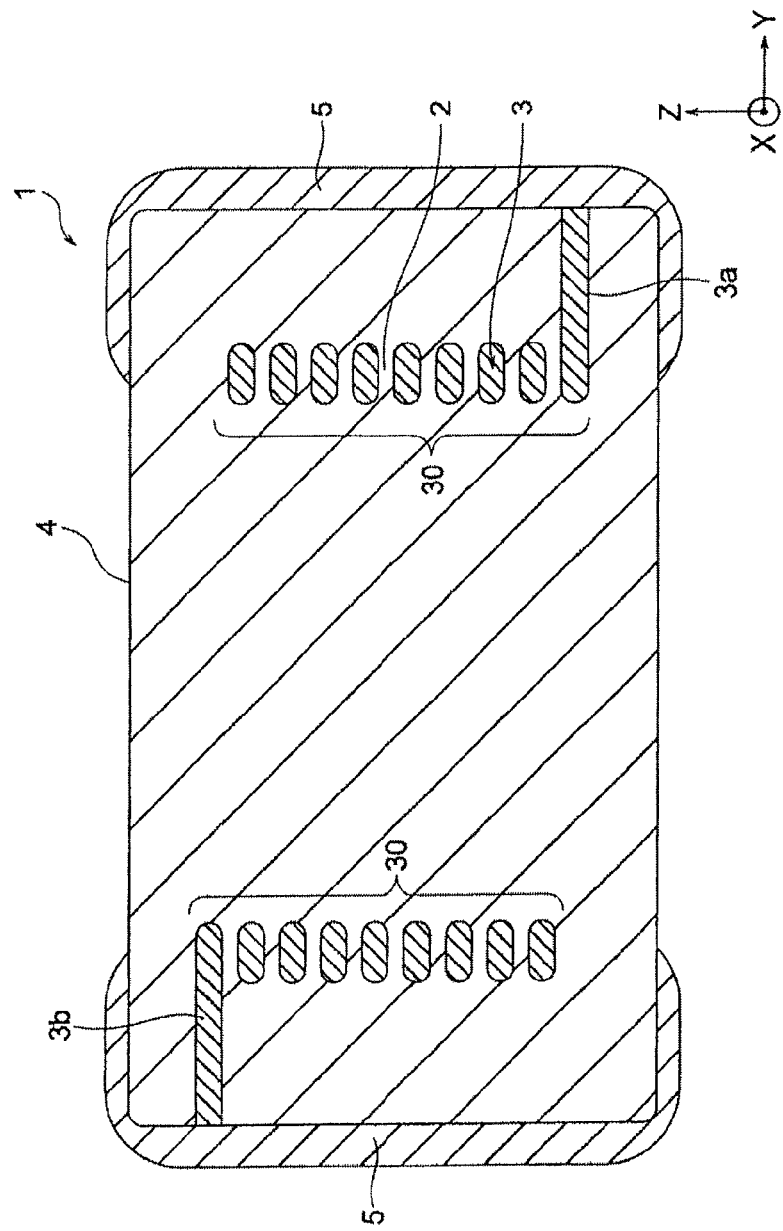

GLASS CERAMIC COMPOSITION AND COIL ELECTRONIC COMPONENT

BACKGROUND OF THE INVENTION

1. Field of the Invention

The present invention relates to a glass ceramic composition capable of being fired at a low temperature with an extremely low permittivity and a sufficient strength and to a coil electronic component having the glass ceramic composition.

2. Description of the Related Art

In accordance with higher frequency of communication devices including mobile phones, a number of ceramic coils corresponding to a high frequency of 1 GHz or higher have been employed for a transmission part and a reception part of the communication devices. In particular, these ceramic coils are required to have a low permittivity for correspondence to high frequency, and a low temperature sintering of 950° C. or lower is essential for applying Ag or Ag alloy with a low resistance and a low loss to an internal conductor.

Thus, a glass-based material with a low permittivity is widely and typically used as a material of the ceramic coils. However, a glass-based material has the following problem: when a glass-based material is used as an element body of a coil electronic component including a ceramic coil, a much lower strength than originally expected is just demonstrated due to cracks originated from flaws, dents, and the like generated on a surface of the element body.

To solve the problem, Patent Document 1 and Patent Document 2 propose techniques for improving a mechanical strength of a glass-based material itself. Although a sufficient mechanical strength can be ensured in using the glass-based material of Patent Document 1 as an element body of a coil electronic component, the glass-based material of Patent Document 1 has the following problem: it is essential to preliminarily calcine a raw material and thus a process load is large due to complexity of manufacturing processes for obtaining ceramic powder with a particle size distribution applicable to multilayer components. Although a mechanical strength can be also ensured in using the glass-based material of Patent Document 2 as an element body, the glass-based material of Patent Document 2 has the following problem: a Q value in a high frequency region is decreased because internal electric layers become uneven due to generation of many crystal particles after being fired.

From another point of view, Patent Document 3 proposes a technique for improving a mechanical strength of a coil electronic component as a whole by sandwiching top and bottom of a coil portion by a glass-based material with a high shape retainability. Such a technique allows shape retention layers to be placed on top and bottom of the coil portion so as to ensure its strength. It is thus possible to use a glass-based material for the internal coil portion that is not necessary to care about strength and favorable for heightening Q values and has the small number of crystal particles and a low relative permittivity. However, a glass-based material with a high strength used for shape retention layers has a relative permittivity that is higher than that of a glass-based material used for a coil portion, and there is thus a problem that a Q value of a coil electronic component as a whole is decreased no matter how selectively a glass-based material that is easy to heighten a Q value is used for the coil portion.

Patent Document 1: Japanese Patent No. 4239534
Patent Document 2: Japanese Unexamined Patent Application Publication No. 2005-15239
Patent Document 3: Japanese Unexamined Patent Application Publication No. 2013-58538

SUMMARY OF THE INVENTION

The present invention has been achieved in consideration of the circumstances, and its object is to provide a glass ceramic composition capable of being fired at a low temperature and having an extremely low permittivity and a sufficient bending strength and to provide a coil electronic component having the glass ceramic composition.

The present inventors have keenly conducted study. As a result, they have found out that a glass ceramic composition for high frequency coils is preferable to have a low permittivity while enabling a low temperature firing and further have a small amount of crystalline material enough to maintain a high strength, and have succeeded in achieving the present invention.

That is, the subject matters of the present invention are as below:

[1] A glass ceramic composition comprising a main component composed of a first glass, a second glass, $Al_2O_3$, and $SiO_2$, wherein
the first glass is $SiO_2$—$K_2O$—$B_2O_3$ based glass,
the second glass is MO—$SiO_2$—$Al_2O_3$—$B_2O_3$ based glass ("M" is an alkaline-earth metal) and/or CaO—$SiO_2$—$Al_2O_3$—ZnO—$ZrO_2$—$B_2O_3$ based glass, and
in case that the total amount of the main component is 100 wt %, the main component contains the second glass of 12 to 30 wt %, the first and second glass of 40 to 56 wt % in total, and further $Al_2O_3$ of 7 to 18 wt %.

[2] The glass ceramic composition as set forth in [1], further comprising a third glass of 5 wt % or less as an additive with respect to the main component of 100 wt %, wherein the third glass is SrO—$SiO_2$—$B_2O_3$ based glass.

[3] The glass ceramic composition as set forth in [1] or [2], wherein $SiO_2$ is quartz and/or quartz glass.

[4] A coil element comprising the glass ceramic composition as set forth in any of [1] to [3].

[5] A sintered body composed of the glass ceramic composition as set forth in any of [1] to [3].

[6] A coil electronic component comprising the ceramic layer composed of the sintered body as set forth in [5].

[7] An electronic component comprising ceramic layers and a coil conductor laminated therebetween, wherein
the coil conductor contains Ag and
the ceramic layer is composed of the sintered body as set forth in [5].

[8] An interlayer composition for high frequency coils comprising a main component composed of a first glass, a second glass, $Al_2O_3$, and $SiO_2$, wherein
the first glass is $SiO_2$—$K_2O$—$B_2O_3$ based glass,
the second glass is MO—$SiO_2$—$Al_2O_3$—$B_2O_3$ based glass ("M" is an alkaline-earth metal) and/or CaO—$SiO_2$—$Al_2O_3$—ZnO—$ZrO_2$—$B_2O_3$ based glass, and
in case that the total amount of the main component is 100 wt %, the main component contains the second glass of 12 to 30 wt %, the first and second glass of 40 to 56 wt % in total, and further $Al_2O_3$ of 7 to 18 wt %.

EFFECTS OF THE INVENTION

According to the present invention, it is possible to provide a glass ceramic composition capable of being fired at a low temperature, having a high density and a high insulation resistance while having an extremely low permittivity, and further achieving a sufficient bending strength at the time of being made into an electronic component, and to provide a coil electronic component having the glass ceramic composition.

BRIEF DESCRIPTION OF THE DRAWINGS

The FIGURE is a cross-sectional view of a multilayer chip coil as a coil electronic component according to one embodiment of the present invention.

DESCRIPTION OF THE PREFERRED EMBODIMENTS

A form (embodiment) for performing the present invention is explained in detail with reference to the figure, but the present invention is not limited to only the embodiment explained below. Also, the following components include one that is easily conceivable for a person skilled in the art and one that is substantially the same. Further, the following components can be suitably combined.

(Coil Electronic Component)

The figure exemplifies a multilayer chip coil 1 as a coil electronic component according to one embodiment of the present invention. The multilayer chip coil 1 has a chip element body 4 where ceramic layers 2 and internal electrode layers 3 are alternatively laminated in the Z-axis direction.

Each of the internal electrode layers 3 has a rectangular circular shape, a C shape, or a U shape and is connected in a spiral shape by stepped electrodes or through hole electrodes (not shown) for connecting internal electrodes passing through adjacent ceramic layers 2 so as to compose a coil conductor 30.

Terminal electrodes 5 are respectively formed at both ends in the Y-axis direction of the chip element body 4. Each of the terminal electrodes 5 is connected to an end of a lead electrode 3a or 3b located above or below in the Z-axis direction and is connected to both ends of the coil conductor 30 composing a closed magnetic circle coil (winding pattern).

In this embodiment, a lamination direction of the ceramic layers 2 and the internal electrode layers 3 corresponds to the Z-axis, and surfaces of the terminal electrodes 5 are parallel to the X-axis and the Y-axis. Note that, each of the X-axis, the Y-axis, and the Z-axis is mutually perpendicular. In the multilayer chip coil 1 shown in the figure, a winding axis of the coil conductor 30 substantially corresponds to the Z-axis.

The chip element body 4 has any outer shape and size, and these may be suitably determined depending on its usage. The chip element body 4 typically has an outer shape of a substantially rectangular parallelepiped shape, and has a length of 0.1 to 0.8 mm in the X-axis, a length of 0.2 to 1.6 mm in the Y-axis, and a length of 0.1 to 1.0 mm in the Z-axis, for example.

The ceramic layers 2 have any thickness among the electrodes and any base thickness. It is possible to configure the thickness among the electrodes (an interval between the internal electrode layers 3 and 3) of approximately 3 to 50 μm and the base thickness (the distance from the lead electrodes 3a and 3b to the ends of the chip element body 4 in the Y-axis direction) of approximately 5 to 300 μm.

In this embodiment, the terminal electrodes 5 are not limited and formed by applying a conductive paste whose main element is Ag and Pd or so onto an outer surface of the element body 4, firing this, and further performing electroplating thereto. This electroplating can be performed using Cu, Ni, Sn etc.

The coil conductor 30 is preferable to contain Ag (including Ag alloy) and is composed of a simple substance of Ag or Ag—Pd alloy, for example. A sub component of the coil conductor may include Zr, Fe, Mn, Ti, or its oxides.

The ceramic layers 2 are composed of a sintered body of a glass ceramic composition according to one embodiment of the present invention. Hereinafter, the glass ceramic composition will be explained in detail.

The glass ceramic composition according to this embodiment has a main component of a first glass, a second glass, $Al_2O_3$, and $SiO_2$. The first glass is $SiO_2$—$K_2O$—$B_2O_3$ based glass. The second glass is MO—$SiO_2$—$Al_2O_3$—$B_2O_3$ based glass ("M" is an alkaline-earth metal) or CaO—$SiO_2$—$Al_2O_3$—ZnO—$ZrO_2$—$B_2O_3$ based glass. Further, in case that the total amount of the main component is 100 wt %, the main component contains the second glass of 12 to 30 wt %, the first and second glass of 40 to 56 wt % in total, and $Al_2O_3$ of 7 to 18 wt %, and its rest is preferably composed of $SiO_2$.

The glass ceramic composition according to the present embodiment is capable of being fired at a low temperature and has a high density and a high insulation resistance with an extremely low permittivity. Further, the glass ceramic composition according to the present embodiment achieves a sufficient bending strength and a high Q value at the time of being made into an electronic component.

As mentioned above, the first glass is $SiO_2$—$K_2O$—$B_2O_3$ based glass. $SiO_2$—$K_2O$—$B_2O_3$ based glass is not limited, and a commercially available glass may be used. Preferably, this glass has a glass transition point of 480 to 520° C. Note that, the glass transition point is measured by a thermomechanical analysis (TMA) apparatus (the same hereinafter).

$SiO_2$—$K_2O$—$B_2O_3$ based glass is mainly composed of $SiO_2$, $K_2O$, and $B_2O_3$. Preferably, this glass contains $SiO_2$ of 77 to 83 wt % and $K_2O$ of 1.6 to 2.4 wt %, and its rest is composed of $B_2O_3$. Also, this glass may contain one or more kind of other element within a scope where the effects of the present invention are not disturbed, and the total amount of other element in this glass is preferably 0.5 wt % or less. For example, this other element includes $Al_2O_3$.

In this embodiment, the second glass is MO—$SiO_2$—$Al_2O_3$—$B_2O_3$ based glass ("M" is an alkaline-earth metal) and/or CaO—$SiO_2$—$Al_2O_3$—ZnO—$ZrO_2$—$B_2O_3$ based glass. That is, the second glass may be mixture of the above two kinds of glass or may be only one of the above two kinds of glass. Preferably, the second glass is at least MO—$SiO_2$—$Al_2O_3$—$B_2O_3$ based glass.

MO—$SiO_2$—$Al_2O_3$—$B_2O_3$ based glass is not limited, and a commercially available glass can be used. "M" is one or more kind of alkaline-earth metal (Mg, Ca, Sr, and Ba) and preferably contains all of Mg, Ca, Sr, and Ba. Preferably, this glass has a glass transition point of 690 to 730° C.

MO—$SiO_2$—$Al_2O_3$—$B_2O_3$ based glass is mainly composed of MO, $SiO_2$, $Al_2O_3$, and $B_2O_3$. Preferably, this glass contains $SiO_2$ of 45 to 55 wt %, $Al_2O_3$ of 10 to 12 wt %, and MO of 28 to 43 wt %, and its rest is composed of $B_2O_3$. Note that, as MO, this glass more preferably contains MgO of 1 to 2.5 wt %, CaO of 3 to 4 wt %, SrO of 24 to 35 wt %, and BaO of 0.1 to 1 wt %. Also, this glass may contain one or more kind of other element within a scope where the effects of the present invention are not disturbed, and the total amount of other element in this glass is preferably 0.5 wt % or less. For example, this other element includes $Na_2O$.

CaO—SiO$_2$—Al$_2$O$_3$—ZnO—ZrO$_2$—B$_2$O$_3$ based glass is not limited, and a commercially available glass can be used. Preferably, this glass has a glass transition point of 650 to 700° C.

CaO—SiO$_2$—Al$_2$O$_3$—ZnO—ZrO$_2$—B$_2$O$_3$ based glass is mainly composed of CaO, SiO$_2$, Al$_2$O$_3$, ZnO, ZrO$_2$, and B$_2$O$_3$. Preferably, this glass contains SiO$_2$ of 40 to 45 wt %, Al$_2$O$_3$ of 28 to 32 wt %, CaO of 9 to 11 wt %, ZnO of 0.5 to 13 wt %, and ZrO$_2$ of 1 to 2 wt %, and its rest is composed of B$_2$O$_3$. Also, this glass may contain one or more kind of other element within a scope where the effects of the present invention are not disturbed, and the total amount of other element in this glass is preferably 0.5 wt % or less. For example, this other element includes TiO$_2$.

Further, the amount of the second glass in the main component is 12 to 30 wt %, preferably 12 to 22 wt %, and more preferably 14 to 20 wt %. When the second glass is contained too much, permittivity tends to be high (e.g., more than 5.0). When the second glass is contained too little, a sufficient bending strength tends to be unable to be ensured.

The total amount of the first glass and the second glass in the main component is 40 to 56 wt %, preferably 45 to 56 wt %, and more preferably 50 to 55 wt %. When the total amount of the first glass and the second glass is too much, a sufficient bending strength tends to be unable to be ensured. When the total amount of the first glass and the second glass is too little, a sufficient sintering tends to be unable to be obtained.

In this embodiment, Alumina (Al$_2$O$_3$) is used as a filler. The amount of Al$_2$O$_3$ in the main component is 7 to 18 wt %, preferably 7 to 15 wt %, and more preferably 7.5 to 12 wt %. When the amount of Al$_2$O$_3$ is too much, relative permittivity tends to be high (e.g., more than 5.0). When the amount of Al$_2$O$_3$ is too little, a sufficient bending strength tends to be unable to be ensured.

Note that, particles composing the filler have any shape such as ball, needle, and plate, but preferably have plate shape from the viewpoint of improving strength, especially bending strength, at the time of being made into an electronic component.

In this embodiment, SiO$_2$ is not limited and can be used in the form of quartz (crystalline silica) or quartz glass (amorphous silica) as a filler. If necessary, both of these may be used simultaneously.

In this embodiment, as mentioned above, the main component is preferable to contain the first glass, the second glass, and Al$_2$O$_3$ at a predetermined amount and contain SiO$_2$ as its rest. More preferably, its rest is composed of only SiO$_2$, but may contain other element within a scope where the effects of the present invention are not disturbed.

The glass ceramic composition according to the present embodiment may further contain a third glass as an additive if necessary. The third glass is SrO—SiO$_2$—B$_2$O$_3$ based glass. Further, the additive amount of the third glass is 5 wt % or less with respect to the main component of 100 wt %.

The third glass shows a favorable sinterability in relation to the main component. Thus, by containing the third glass within the above range, the glass ceramic composition according to the present embodiment can ensure a more stable sinterability against variations of firing conditions, rod size, and the like accompanying mass production, and firing conditions preferable for mass production can be widely adopted.

In this embodiment, the third glass is SrO—SiO$_2$—B$_2$O$_3$ based glass. This SrO—SiO$_2$—B$_2$O$_3$ based glass is not limited, and a commercially available glass can be used. Preferably, this glass has a glass transition point of 640 to 670° C. The glass ceramic composition according to the present embodiment contains a third glass with a low softening point, which can ensure a favorable sinterability despite a relatively low temperature firing.

SrO—SiO$_2$—B$_2$O$_3$ based glass is mainly composed of SiO$_2$, SrO, and B$_2$O$_3$. Preferably, this glass contains SiO$_2$ of 10 to 15 wt % and SrO of 40 to 45 wt %, and its rest is composed of B$_2$O$_3$. Also, this glass may contain one or more kind of other element within a scope where the effects of the present invention are not disturbed, and the total amount of other element in this glass is preferably 1.0 wt % or less. For example, this other element includes Na$_2$O and CaO.

The additive amount of the third glass is 5 wt % or less, preferably 2 to 5 wt %, and more preferably 3 to 4.5 wt % with respect to the main component of 100 wt %. When the additive amount of the third glass is too much, the softening extent of glass phase by firing tends to be large. In particular, when the softening extent of glass phase by firing is large, the fired chip element body 4 is easily fused with stuff contacting therewith at the time of being made into an electronic component.

The multilayer chip coil 1 shown in the figure can be manufactured by general manufacturing method. That is, the glass ceramic composition of the present invention is kneaded with a binder and a solvent to obtain a glass ceramic paste, and this glass ceramic paste is printed and laminated alternatively with a conductive paste containing Ag to be fired. As a result, the chip element body 4 can be formed (printing method).

Instead, the chip element body 4 may be formed by making green sheets using a glass ceramic paste, printing an internal electrode paste on the surfaces of the green sheets, and laminating and firing them (sheet method). In either of the methods, the terminal electrodes 5 are formed by baking, plating or so after forming the chip element body 4.

The amount of the binder and the solvent in the glass ceramic paste is not limited. For example, the mount of the binder may be around 5 to 25 wt %, and the amount of the solvent may be around 30 to 80 wt %. If necessary, the paste may contain dispersant, plasticizer, dielectric, insulator, and the like within a range of 20 wt % or less. A conductive paste containing Ag can be prepared in the same way. The firing conditions or so are not limited, but if the internal electrode layers contain Ag or so, its firing temperature is preferably 950° C. or less and more preferably 900° C. or less.

A relative density of the sintered body composed of the glass ceramic composition of the present embodiment is preferably 80% or higher, more preferably 85% or higher, and still more preferably 90% or higher when the theoretical density is 100%. In the present specification, the relative density means a ratio of a measured value of density with respect to the theoretical density. For example, the sintered body is pulverized in a mortar until it becomes size not affected by bubbles in an element body, a true density is measured by gas phase substitution method (Archimedes' principle), and this can be employed as the theoretical density of the sintered body. The measured value of the density of the sintered body can be calculated by measuring size and weight of the sintered body, for example. The relative density of the sintered body can be adjusted by changing firing temperature, firing time, and the like.

The glass ceramic composition according to the present embodiment may be non-sintered powder, aggregate, and glass ceramic material that is a form of a solid content or so contained in a slurry. Due to excellence in sinterability, the glass ceramic composition according to the present embodiment can be a glass ceramic sintered body having a sufficiently high sintered density (density of the sintered body) even if fired at a low temperature of preferably around 840 to 950° C. and more preferably around 870 to 950° C. Thus, for example, the glass ceramic composition according to the present embodiment can be favorably used as ceramic layers of a coil electronic component, including a multilayer chip coil with a conductor of Ag, which is required to be sintered at a low temperature.

Note that, the present invention is not limited to the above-mentioned embodiment, but can be variously changed within a scope thereof.

The glass ceramic composition according to the present embodiment can be used as a coil element of a semiconductor apparatus. For example, the coil element according to the present invention includes a coil device combined with a board of a semiconductor apparatus after thinning the glass ceramic composition according to the present invention.

The glass ceramic composition according to the present embodiment can be favorably used as an interlayer composition for high frequency coils.

The glass ceramic composition according to the present embodiment can be fired at a low temperature and is excellent in mechanical strength while having an extremely low permittivity. Thus, this glass ceramic composition is favorable as a material composing ceramic layers of a coil electronic component. Further, this glass ceramic composition is particularly more preferable as an interlayer composition composing the ceramic layers 2 among the internal electrode layers 3 and 3 due to an extremely small generation of crystal particles during firing.

The interlayer composition according to the present embodiment makes it possible to prevent generation of crystal particles in fired ceramic layers, obtain smooth internal electrode layers with little unevenness, and achieves a high Q value in high frequency region as the whole coil electronic component. This interlayer composition is particularly preferable for a high frequency coil used for a frequency region of 1 GHz or higher.

The above-mentioned embodiment shows that the ceramic layers 2 of the coil electronic component 1 are formed by the same material, but are not necessarily formed by the same material. As mentioned above, the glass ceramic composition according to the present embodiment is particularly preferable as an interlayer composition composing the ceramic layers 2 among the internal electrode layers 3 and 3, and ceramic layers 2 that are not contacted with the coil conductors 30 may be composed of other ceramic material.

EXAMPLE

Hereinafter, the present invention will be explained based on further detailed Examples, but is not limited thereto.

Example 1

First, $SiO_2$—$K_2O$—$B_2O_3$ based glass was prepared as a first glass, MO—$SiO_2$—$Al_2O_3$—$B_2O_3$ based glass was prepared as a second glass, alumina ($Al_2O_3$) was prepared, quartz glass (amorphous silica) was prepared as $SiO_2$, and SrO—$SiO_2$—$B_2O_3$ based glass was prepared as a third glass. Each raw material was weighed to have the composition shown in Table 1.

Next, the raw materials weighed in advance were wet mixed with a solvent (99% methanol denatured ethanol) for 24 hours using a ball mill (media were zirconia balls) to obtain a raw material slurry. This raw material slurry was dried in a drying machine until the solvent disappeared. Then, a glass ceramic material was obtained.

Next, 2.5 pts. wt. of an acrylic resin-based binder (Elvacit by DuPont) were added as a binder to 100 pts. wt. of the obtained glass ceramic material and granulated so as to obtain granules by performing sizing with a 20-mesh sieve. These granules were press molded by 74 MPa (0.75 ton/cm$^2$) to obtain a molded body of a 17φ disc shape (size=diameter: 17 mm, thickness: 8.5 mm). Thereafter, the obtained molded body was fired for 2 hours at 900° C. in the air. Then, sintered bodies were obtained (Samples 1 to 32).

Next, various characteristic evaluations were performed for the obtained sintered bodies (Samples 1 to 32) under the following conditions. The result is shown in Table 1.

[Relative Density]

A relative density (%) was obtained by calculating a sintered body density from size and weight of the obtained sintered bodies and calculating a ratio of the sintered body density with respect to theoretical density.

[Relative Permittivity µs]

A relative permittivity (no unit) was measured by the resonance method (JIS R 1627) using a network analyzer (HEWLETT PACKARD, 8510C). Note that, in this Example, a relative permittivity of 5.0 or lower was considered to be favorable.

[Insulation Resistance ρ]

An insulation resistance (unit: Ωm) was calculated from a resistance value and size after applying In-Ga electrodes to both surfaces of the obtained sintered bodies and measuring a DC resistance value. The measurement was performed under a condition of 25V and 30 seconds using an insulation resistance meter (HEWLETT PACKARD, 4329A). Note that, in this Example, an insulation resistance of $1 \times 10^7$ Ω·m or higher was considered to be favorable.

Example 2

First, a glass ceramic material having the composition in Table 1 was obtained in the same way as Example 1.

Next, an acrylic resin-based binder (Elvacit by DuPont) was added as a binder to 100 pts. wt. of the glass ceramic material and sufficiently mixed to obtain a glass ceramic slurry. Thereafter, the obtained glass ceramic slurry was molded by a doctor blade method. Then, green sheets whose thickness was 30 µm were obtained.

Next, after a via hole was formed on a predetermined position of the obtained green sheets, a separately prepared conductive paste containing silver powder, varnish, and organic solvent was screen printed on the surfaces of the green sheets and filled in the via hole. Then, internal electrode layers having a predetermined shaped coil pattern and the via hole were formed.

Thereafter, the green sheets having a predetermined coil pattern were appropriately laminated. Then, these were sandwiched by green sheets having no internal electrode layers, press bonded by 100 MPa at a temperature of 60° C., and cut to a predetermined size. As a result, a multilayer body was obtained.

Further, the obtained multilayer body was heated at 400° C. in the air to be degreased sufficiently. Next, the multilayer body was charged to a firing furnace, and held for 1 to 5 hours in a temperature range of 900 to 930° C. in the air so as to be heat treated (firing). Then, a chip element body was obtained.

Next, a conductive paste for terminal electrodes containing silver powder, glass frit, varnish, and organic solvent was prepared, applied to both ends opposing to an axial direction of a coil of the chip element body, dried, and fired at 750° C. Then, terminal electrodes were formed, and multilayer chip coils (0.6 mm×0.3 mm×0.3 mm) were obtained.

Next, a bending strength test was performed for the obtained multilayer chip coils (Samples 1 to 32) under the following conditions. The result is shown in Table 1.

[Bending Strength Test]

A bending strength test was performed as below. After 10 samples per Samples 1 to 32 were soldered to a central area of a substrate (a glass epoxy substrate, size: 100 mm×40 mm, thickness: 0.08 mm), a load was applied onto a surface (rear of the substrate) different from the surface where the samples were soldered (bending amount=5 second holding, 1.3 mm), and whether the loaded samples had a crack on their exterior and interior was evaluated. Note that, in this Example, it was considered to be favorable that no crack was generated out of the 10 samples per Samples.

It was confirmed from the result of Example 1 that the sintered bodies (Samples 2 to 5, 11 to 14, 20 to 24, and 27 to 32) composed of the glass ceramic composition according to the present invention had a high insulation resistance and a low relative permittivity.

It was confirmed from the result of Example 2 that the multilayer chip coils having the sintered bodies (Samples 2 to 5, 11 to 14, 20 to 24, and 27 to 32) composed of the glass ceramic composition according to the present invention had an excellent strength against bending.

Examples 3 and 4

Sintered bodies and multilayer chip coils (Samples 51 to 82) were prepared in the same way as Examples 1 and 2, except that $CaO—SiO_2—Al_2O_3—ZnO—ZrO_2—B_2O_3$ based glass was used as a second glass and that a glass ceramic material was obtained to have the composition shown in Table 2. Various characteristics were evaluated under the same conditions. The result is shown in Table 2.

TABLE 1

| Sample No. | Composition of Main Component (100 wt % in total) | | | | Additive (wt %) | 1st Glass + 2nd Glass (wt %) | Relative Density (%) | Relative Permittivity $\epsilon_s$ | Insulation Resistance $\rho$ ($\Omega \cdot m$) | Crack Incidence during Bending Strength Test |
|---|---|---|---|---|---|---|---|---|---|---|
| | 1st Glass | 2nd Glass | $Al_2O_3$ | $SiO_2$ | 3rd Glass | | | | | |
| 1 | 20 | 33 | 12 | 35 | 0 | 53 | 94.4 | 5.03 | 4.6E+10 | 0/10 |
| 2 | 23 | 30 | 12 | 35 | 0 | 53 | 92.1 | 4.72 | 9.1E+10 | 0/10 |
| 3 | 31 | 22 | 12 | 35 | 0 | 53 | 89.2 | 4.47 | 2.6E+11 | 0/10 |
| 4 | 35 | 18 | 12 | 35 | 0 | 53 | 83.7 | 4.24 | 8.7E+09 | 0/10 |
| 5 | 41 | 12 | 12 | 35 | 0 | 53 | 84.9 | 4.28 | 1.8E+09 | 0/10 |
| 6 | 43 | 10 | 12 | 35 | 0 | 53 | 86.4 | 4.33 | 9.5E+08 | 2/10 |
| 7 | 43 | 10 | 18 | 29 | 0 | 53 | 83.6 | 4.26 | 8.7E+08 | 1/10 |
| 8 | 23 | 12 | 12 | 53 | 0 | 35 | 72.8 | 3.74 | 4.5E+06 | 3/10 |
| 9 | 23 | 12 | 12 | 53 | 5 | 35 | 78.9 | 4.08 | 6.2E+08 | 4/10 |
| 10 | 5 | 30 | 12 | 53 | 5 | 35 | 79.8 | 4.19 | 4.8E+09 | 2/10 |
| 11 | 15 | 25 | 12 | 48 | 5 | 40 | 85.7 | 4.42 | 6.3E+09 | 0/10 |
| 12 | 20 | 25 | 12 | 43 | 3 | 45 | 84.5 | 4.39 | 1.9E+10 | 0/10 |
| 13 | 26 | 25 | 12 | 37 | 0 | 51 | 91.2 | 4.63 | 1.1E+11 | 0/10 |
| 14 | 31 | 25 | 12 | 32 | 0 | 56 | 95.7 | 4.89 | 2.3E+11 | 0/10 |
| 15 | 33 | 25 | 12 | 30 | 0 | 58 | 95.5 | 4.88 | 2.1E+11 | 2/10 |
| 16 | 33 | 25 | 18 | 24 | 0 | 58 | 94.7 | 4.93 | 1.7E+11 | 1/10 |
| 17 | 28 | 30 | 18 | 24 | 0 | 58 | 95.2 | 5.03 | 2.5E+11 | 0/10 |
| 18 | 25 | 30 | 19 | 26 | 0 | 55 | 94.9 | 5.09 | 2.0E+12 | 0/10 |
| 19 | 30 | 12 | 19 | 39 | 0 | 42 | 95.5 | 5.03 | 1.1E+11 | 0/10 |
| 20 | 28 | 25 | 18 | 29 | 0 | 53 | 95.6 | 4.97 | 1.8E+11 | 0/10 |
| 21 | 28 | 25 | 15 | 32 | 0 | 53 | 95.7 | 4.92 | 1.0E+11 | 0/10 |
| 22 | 28 | 25 | 12 | 35 | 0 | 53 | 95.3 | 4.88 | 1.2E+11 | 0/10 |
| 23 | 28 | 25 | 10 | 37 | 0 | 53 | 95.0 | 4.81 | 1.8E+10 | 0/10 |
| 24 | 28 | 25 | 7 | 40 | 0 | 53 | 94.3 | 4.75 | 1.1E+10 | 0/10 |
| 25 | 40 | 25 | 6 | 29 | 0 | 65 | 95.0 | 4.71 | 1.8E+10 | 1/10 |
| 26 | 25 | 30 | 6 | 39 | 5 | 55 | 92.7 | 4.62 | 3.3E+10 | 2/10 |
| 27 | 30 | 25 | 12 | 33 | 0.5 | 55 | 95.3 | 4.87 | 2.2E+11 | 0/10 |
| 28 | 30 | 25 | 12 | 33 | 1 | 55 | 95.1 | 4.87 | 1.8E+11 | 0/10 |
| 29 | 30 | 25 | 12 | 33 | 3 | 55 | 95.0 | 4.85 | 1.4E+11 | 0/10 |
| 30 | 30 | 25 | 12 | 33 | 5 | 55 | 94.8 | 4.86 | 2.8E+11 | 0/10 |
| 31 | 30 | 25 | 12 | 33 | 7 | 55 | 94.5 | 4.84 | 4.4E+11 | 0/10 |
| 32 | 15 | 25 | 12 | 48 | 7 | 40 | 88.3 | 4.53 | 1.6E+10 | 0/10 |

1st Glass: $SiO_2—K_2O—B_2O_3$ based glass
2nd Glass: $MO—SiO_2—Al_2O_3—B_2O_3$ based glass
3rd Glass: $SrO—SiO_2—B_2O_3$ based glass

TABLE 2

| Sample No. | Composition of Main Component (100 wt % in total) | | | | Additive (wt %) | 1st Glass + 2nd Glass (wt %) | Relative Density (%) | Relative Permittivity $\epsilon_s$ | Insulation Resistance $\rho$ ($\Omega \cdot m$) | Crack Incidence during Bending Strength Test |
|---|---|---|---|---|---|---|---|---|---|---|
| | 1st Glass | 2nd Glass | $Al_2O_3$ | $SiO_2$ | 3rd Glass | | | | | |
| 51 | 20 | 33 | 12 | 35 | 0 | 53 | 95.8 | 5.06 | 1.9E+10 | 0/10 |
| 52 | 23 | 30 | 12 | 35 | 0 | 53 | 95.5 | 4.88 | 5.4E+10 | 0/10 |
| 53 | 31 | 22 | 12 | 35 | 0 | 53 | 95.1 | 4.67 | 1.2E+11 | 0/10 |
| 54 | 35 | 18 | 12 | 35 | 0 | 53 | 94.8 | 4.41 | 3.4E+09 | 0/10 |
| 55 | 41 | 12 | 12 | 35 | 0 | 53 | 92.8 | 4.22 | 9.3E+08 | 0/10 |
| 56 | 43 | 10 | 12 | 35 | 0 | 53 | 90.2 | 4.15 | 7.7E+08 | 2/10 |
| 57 | 43 | 10 | 18 | 29 | 0 | 53 | 89.1 | 4.17 | 6.8E+09 | 2/10 |
| 58 | 23 | 12 | 12 | 53 | 0 | 35 | 74.0 | 3.71 | 2.3E+07 | 3/10 |
| 59 | 23 | 12 | 12 | 53 | 5 | 35 | 80.2 | 4.11 | 2.3E+08 | 3/10 |
| 60 | 5 | 30 | 12 | 53 | 5 | 35 | 81.1 | 4.20 | 8.7E+09 | 3/10 |
| 61 | 15 | 25 | 12 | 48 | 5 | 40 | 86.2 | 4.41 | 1.1E+10 | 0/10 |
| 62 | 20 | 25 | 12 | 43 | 3 | 45 | 87.5 | 4.40 | 2.4E+10 | 0/10 |
| 63 | 26 | 25 | 12 | 37 | 0 | 51 | 92.1 | 4.60 | 6.2E+11 | 0/10 |
| 64 | 31 | 25 | 12 | 32 | 0 | 56 | 95.6 | 4.84 | 9.0E+10 | 0/10 |
| 65 | 33 | 25 | 12 | 30 | 0 | 58 | 95.6 | 4.84 | 8.5E+10 | 2/10 |
| 66 | 33 | 25 | 18 | 24 | 0 | 58 | 95.3 | 4.90 | 1.0E+10 | 1/10 |
| 67 | 28 | 30 | 18 | 24 | 0 | 58 | 96.2 | 5.04 | 1.2E+11 | 0/10 |
| 68 | 25 | 30 | 19 | 26 | 0 | 55 | 97.0 | 5.15 | 1.8E+12 | 0/10 |
| 69 | 30 | 12 | 19 | 39 | 0 | 42 | 94.5 | 5.02 | 9.0E+10 | 0/10 |
| 70 | 28 | 25 | 18 | 29 | 0 | 53 | 95.8 | 4.95 | 1.5E+11 | 0/10 |
| 71 | 28 | 25 | 15 | 32 | 0 | 53 | 95.9 | 4.89 | 9.9E+10 | 0/10 |
| 72 | 28 | 25 | 12 | 35 | 0 | 53 | 95.9 | 4.85 | 1.1E+11 | 0/10 |
| 73 | 28 | 25 | 10 | 37 | 0 | 53 | 95.5 | 4.77 | 9.8E+09 | 0/10 |
| 74 | 28 | 25 | 7 | 40 | 0 | 53 | 95.6 | 4.71 | 1.0E+10 | 0/10 |
| 75 | 40 | 25 | 6 | 29 | 0 | 65 | 95.4 | 4.63 | 1.3E+10 | 2/10 |
| 76 | 25 | 30 | 6 | 39 | 5 | 55 | 95.6 | 4.66 | 1.8E+10 | 3/10 |
| 77 | 30 | 25 | 12 | 33 | 0.5 | 55 | 95.2 | 4.82 | 9.8E+10 | 0/10 |
| 78 | 30 | 25 | 12 | 33 | 1 | 55 | 95.6 | 4.86 | 8.5E+10 | 0/10 |
| 79 | 30 | 25 | 12 | 33 | 3 | 55 | 95.8 | 4.90 | 7.0E+10 | 0/10 |
| 80 | 30 | 25 | 12 | 33 | 5 | 55 | 96.2 | 4.98 | 9.8E+10 | 0/10 |
| 81 | 30 | 25 | 12 | 33 | 7 | 55 | 96.0 | 4.96 | 8.9E+10 | 0/10 |
| 82 | 15 | 25 | 12 | 48 | 7 | 40 | 90.7 | 4.31 | 3.7E+10 | 0/10 |

1st Glass: $SiO_2$—$K_2O$—$B_2O_3$ based glass
2nd Glass: CaO—$SiO_2$—$Al_2O_3$—ZnO—$ZrO_2$—$B_2O_3$ based glass
3rd Glass: SrO—$SiO_2$—$B_2O_3$ based glass It was confirmed from the result of Example 3 that the sintered bodies (Samples 52 to 55, 61 to 64, 70 to 74, and 77 to 82) composed of the glass ceramic composition according to the present invention had a high insulation resistance and a low relative permittivity.

It was confirmed from the result of Example 4 that the multilayer chip coils having the sintered bodies (Samples 52 to 55, 61 to 64, 70 to 74, and 77 to 82) composed of the glass ceramic composition according to the present invention had an excellent strength against bending.

NUMERICAL REFERENCES

1 . . . multilayer chip coil
2 . . . ceramic layer
3 . . . internal electrode layer
3a, 3b . . . leading electrode
30 . . . coil conductor
4 . . . chip element body
5 . . . terminal electrode

The invention claimed is:

1. A glass ceramic composition comprising a main component composed of a first glass, a second glass, $Al_2O_3$, and $SiO_2$, wherein
the first glass is $SiO_2$—$K_2O$—$B_2O_3$ based glass,
the second glass is MO—$SiO_2$—$Al_2O_3$—$B_2O_3$ based glass ("M" is an alkaline-earth metal) and/or CaO—$SiO_2$—$Al_2O_3$—ZnO—$ZrO_2$—$B_2O_3$ based glass, and
in case that the total amount of the main component is 100 wt %, the main component contains the second glass of 12 to 30 wt %, the first and second glass of 40 to 56 wt % in total, and further $Al_2O_3$ of 7 to 18 wt %.

2. The glass ceramic composition as set forth in claim 1, further comprising a third glass of 5 wt % or less as an additive with respect to the main component of 100 wt %, wherein
the third glass is SrO—$SiO_2$—$B_2O_3$ based glass.

3. The glass ceramic composition as set forth in claim 1, wherein
$SiO_2$ is quartz and/or quartz glass.

4. The glass ceramic composition as set forth in claim 2, wherein
$SiO_2$ is quartz and/or quartz glass.

5. A coil element comprising the glass ceramic composition as set forth in claim 1.

6. A sintered body composed of the glass ceramic composition as set forth in claim 1.

7. A coil electronic component comprising ceramic layers composed of the sintered body as set forth in claim 6.

8. An electronic component comprising ceramic layers and a coil conductor laminated therebetween, wherein
the coil conductor contains Ag and
the ceramic layer is composed of the sintered body as set forth in claim 6.

9. An interlayer composition for high frequency coils comprising a main component composed of a first glass, a second glass, $Al_2O_3$, and $SiO_2$, wherein
the first glass is $SiO_2$—$K_2O$—$B_2O_3$ based glass,
the second glass is MO—$SiO_2$—$Al_2O_3$—$B_2O_3$ based glass ("M" is an alkaline-earth metal) and/or CaO—$SiO_2$—$Al_2O_3$—ZnO—$ZrO_2$—$B_2O_3$ based glass, and in case that the total amount of the main component is 100 wt %, the main component contains the second glass of 12 to 30 wt %, the first and second glass of 40 to 56 wt % in total, and further $Al_2O_3$ of 7 to 18 wt %.

\* \* \* \* \*